United States Patent
Keeter

(10) Patent No.: US 11,880,856 B1
(45) Date of Patent: Jan. 23, 2024

(54) RECALL AND PROMOTION PROCESSING SYSTEM AND RELATED METHODS

(71) Applicant: Inmar Clearing, Inc., Winston-Salem, NC (US)

(72) Inventor: John Keeter, Clemmons, NC (US)

(73) Assignee: INMAR CLEARING, INC., Winston-Salem, NC (US)

(*) Notice: Subject to any disclaimer, the term of this patent is extended or adjusted under 35 U.S.C. 154(b) by 0 days.

(21) Appl. No.: 17/958,471

(22) Filed: Oct. 3, 2022

(51) Int. Cl.
*G06Q 30/00* (2023.01)
*G06Q 30/0208* (2023.01)
*G06Q 20/20* (2012.01)
*G06Q 30/014* (2023.01)
*G05B 19/418* (2006.01)

(52) U.S. Cl.
CPC ....... *G06Q 30/0208* (2013.01); *G06Q 20/202* (2013.01); *G06Q 30/014* (2013.01)

(58) Field of Classification Search
CPC . G06Q 30/0208; G06Q 20/202; G06Q 30/014
See application file for complete search history.

(56) References Cited

U.S. PATENT DOCUMENTS

| | | | |
|---|---|---|---|
| 8,180,669 B2 | 5/2012 | Mansfield, Jr. | |
| 90,533,510 | 6/2015 | Crum | |
| 9,697,523 B2 | 7/2017 | Hancock et al. | |
| 9,846,880 B2 | 12/2017 | Fordyce, III et al. | |
| 10,192,243 B1* | 1/2019 | Genc-Kaya | G06Q 30/0273 |
| 2009/0032589 A1 | 2/2009 | Bowlus | |
| 2009/0144104 A1 | 6/2009 | Johnson | |
| 2012/0005105 A1 | 1/2012 | Beier et al. | |
| 2012/0323678 A1* | 12/2012 | Mansfield, Jr. | G06Q 30/0207 705/16 |
| 2013/0036061 A1 | 2/2013 | Alexander et al. | |
| 2013/0054369 A1* | 2/2013 | Grigg | G06Q 30/02 705/14.58 |

OTHER PUBLICATIONS

"Analysis of Different Predicting Model for Online Shoppers' Purchase Intention from Empirical Data".IEEE.2019. (Year: 2019).*
"Case Study: Modeling Response to Direct Mail Marketing". IEEE. 2006. (Year: 2006).*

* cited by examiner

Primary Examiner — Maria V Vanderhorst
(74) Attorney, Agent, or Firm — ALLEN, DYER, DOPPELT + GILCHRIST, P.A.

(57) ABSTRACT

A recall and promotion processing system may include shopper devices, each associated with a corresponding shopper, and a recall-promotion processing server. The server may obtain historical purchase data associated with the shoppers, and determine whether a given recalled product was purchased by a given shopper based upon the historical purchase data. The server may, when the given recalled product was purchased by the given shopper, generate and communicate a recall notification and a digital promotion to the corresponding shopper device. The digital promotion may be redeemable toward a product for purchase based upon the given recalled product and may have a redeemable value associated therewith. The server may, when the given recalled product was purchased by the given shopper, obtain redemption data associated with the digital promotion for the shoppers, and adjust a subsequent redeemable value for a subsequent digital promotion based upon the redemption data.

9 Claims, 8 Drawing Sheets

RECALL-PROMOTION PROCESSING SERVER

- OBTAIN HISTORICAL PURCHASE DATA ASSOCIATED WITH THE SHOPPERS

- DETERMINE WHETHER A GIVEN RECALLED PRODUCT (E.G., HAVING A PRODUCT IDENTIFIER ASSOCIATED THEREWITH) WAS PURCHASED BY A GIVEN SHOPPER FROM AMONG THE SHOPPERS BASED UPON THE HISTORICAL PURCHASE DATA (E.G., BASED UPON THE PRODUCT IDENTIFIER), AND WHEN SO,

○ GENERATE AND COMMUNICATE A RECALL NOTIFICATION TO THE CORRESPONDING SHOPPER DEVICE ASSOCIATED WITH THE GIVEN SHOPPER

○ GENERATE AND COMMUNICATE A DIGITAL PROMOTION TO THE CORRESPONDING SHOPPER DEVICE, THE DIGITAL PROMOTION BEING REDEEMABLE TOWARD A PRODUCT FOR PURCHASE BASED UPON THE GIVEN RECALLED PRODUCT, AND THE DIGITAL PROMOTION HAVING A REDEEMABLE VALUE ASSOCIATED THEREWITH

○ OBTAIN REDEMPTION DATA ASSOCIATED WITH THE DIGITAL PROMOTION FOR THE SHOPPERS (E.G., BASED UPON COOPERATION WITH POS DEVICES)

○ OPTIONALLY DETERMINE A REDEMPTION RATE BASED UPON THE REDEMPTION DATA (E.G., AN ACTUAL REDEMPTION RATE BASED UPON THE REDEMPTION DATA FROM THE POS DEVICES)

○ OPERATE A MACHINE LEARNING ALGORITHM THAT ACCEPTS AS INPUT THERETO, THE REDEMPTION DATA FOR THE SHOPPERS, AND GENERATES, AS AN OUTPUT FROM THE MACHINE LEARNING ALGORITHM, A PREDICTED REDEMPTION RATE OF THE DIGITAL PROMOTION

○ ADJUST A SUBSEQUENT REDEEMABLE VALUE FOR A SUBSEQUENT DIGITAL PROMOTION BASED UPON THE PREDICTED REDEMPTION RATE (E.G., ALSO BASED UPON THE ACTUAL REDEMPTION RATE; TO INCREASE THE REDEMPTION VALUE OF THE SUBSEQUENT DIGITAL PROMOTION BASED UPON A LOWER PREDICTED REDEMPTION RATE)

RECALL AND PROMOTION PROCESSING SYSTEM AND RELATED METHODS

TECHNICAL FIELD

The present invention relates to the field of recalled products, and, more particularly, to processing a promotion associated with a recalled product and related methods.

BACKGROUND

A product recall is a request, for example, made by a product manufacturer or government agency, to discontinue the use of a product (e.g., return or destroy the product). The product subject to the recall may have a defect associated with it that caused the recall. Relatively quick notification of a recalled product may be particularly desirable to reduce potential negative effects that may occur as a result of use of the recalled product.

Sales of a particular product or service may be based upon how well that product or service is marketed to a consumer. One form of marketing or promotion is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period. Other promotional terms may include companion product and purchase quantity requirements.

SUMMARY

A recall and promotion processing system may include a plurality of shopper devices, each associated with a corresponding shopper. The recall and promotion system may also include a recall-promotion processing server configured to obtain historical purchase data associated with the plurality of shoppers, and determine whether a given recalled product was purchased by a given shopper from among the plurality of shoppers based upon the historical purchase data. The recall-promotion processing server may be configured to, when the given recalled product was purchased by the given shopper, generate and communicate a recall notification to the corresponding shopper device associated with the given shopper, and generate and communicate a digital promotion to the corresponding shopper device associated with the given shopper. The digital promotion may be redeemable toward a product for purchase based upon the given recalled product, and the digital promotion may have a redeemable value associated therewith. The recall-promotion processing server may be configured to, when the given recalled product was purchased by the given shopper obtain redemption data associated with the digital promotion for the plurality of shoppers, and adjust a subsequent redeemable value for a subsequent digital promotion based upon the redemption data.

The recall-promotion processing server may be configured to operate a machine learning algorithm that accepts, as an input thereto, the redemption data for the plurality of shoppers, and generates, as an output from the machine learning algorithm, a predicted redemption rate of the digital promotion. The recall-promotion processing server may be configured to adjust the subsequent redeemable value based upon the predicted redemption rate, for example. The recall-promotion processing server may be configured to increase the redeemable value of the subsequent digital promotion based upon a lower predicted redemption rate, for example.

The recall-promotion processing server may be configured to determine a redemption rate based upon redemption data and adjust the subsequent redeemable value based upon the redemption rate. The recall-promotion processing server may be configured to cooperate with a plurality of point-of-sale (POS) devices to obtain the redemption data, for example. The recall-promotion processing server may be configured to determine an actual redemption rate based upon the redemption data from the plurality of POS devices, for example.

The given recalled product may have a product identifier associated therewith. The recall-promotion processing server may be configured to determine whether the given recalled product was purchased by the given shopper based upon the product identifier, for example.

A method aspect is directed to a method of processing a recall-promotion. The method may include using a recall-promotion processing server to obtain historical purchase data associated with a plurality of shoppers, and determine whether a given recalled product was purchased by a given shopper from among the plurality of shoppers based upon the historical purchase data. The method may also include using the recall-promotion processing server to, when the given recalled product was purchased by the given shopper generate and communicate a recall notification to a corresponding shopper device associated with the given shopper, and generate and communicate a digital promotion to the corresponding shopper device associated with the given shopper. The digital promotion may be redeemable toward a product for purchase based upon the given recalled product, and the digital promotion may have a redeemable value associated therewith.

The method may also include using the recall-promotion processing server to, when the given recalled product was purchased by the given shopper, obtain redemption data associated with the digital promotion for the plurality of shoppers, and adjust a subsequent redeemable value for a subsequent digital promotion based upon the redemption data.

A computer readable medium aspect is directed to a non-transitory computer readable medium for processing a recall-promotion. The non-transitory computer readable medium includes computer executable instructions that when executed by a processor of a recall-promotion processing server cause the processor to perform operations. The operations may include obtaining historical purchase data associated with a plurality of shoppers, and determining whether a given recalled product was purchased by a given shopper from among the plurality of shoppers based upon the historical purchase data.

The operations may include, when the given recalled product was purchased by the given shopper, generating and communicating a recall notification to a corresponding shopper device associated with the given shopper, and generating and communicating a digital promotion to the corresponding shopper device associated with the given shopper. The digital promotion may be redeemable toward a product for purchase based upon the given recalled product, and the digital promotion may have a redeemable value associated therewith. The operations may further include, when the given recalled product was purchased by the given shopper, obtaining redemption data associated with the digital promotion for the plurality of shoppers, and adjusting a subsequent redeemable value for a subsequent digital promotion based upon the redemption data.

BRIEF DESCRIPTION OF THE DRAWINGS

FIG. 7 is a schematic block diagram of the recall-promotion processing server of FIG. 6.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Referring initially to FIGS. 1-4, a recall and promotion processing system 20 includes shopper devices 30a-30n, each associated with a corresponding shopper. The shopper devices 30a-30n are illustratively in the form of mobile wireless communications devices, and more particularly, mobile phones or smartphones. Of course, the user devices 30a-30n may be in the form of another type of device, such as, for example, a tablet computer, a personal computer, or a wearable computer.

The recall and promotion processing system 20 also includes a recall-promotion processing server 40. The recall-promotion processing server 40 includes a processor 41 and an associated memory 42. While operations of the recall-promotion processing server 40 are described herein, it should be appreciated by those skilled in the art that the operations are performed based upon cooperation between the processor 41 and the memory 42.

Figure 5:
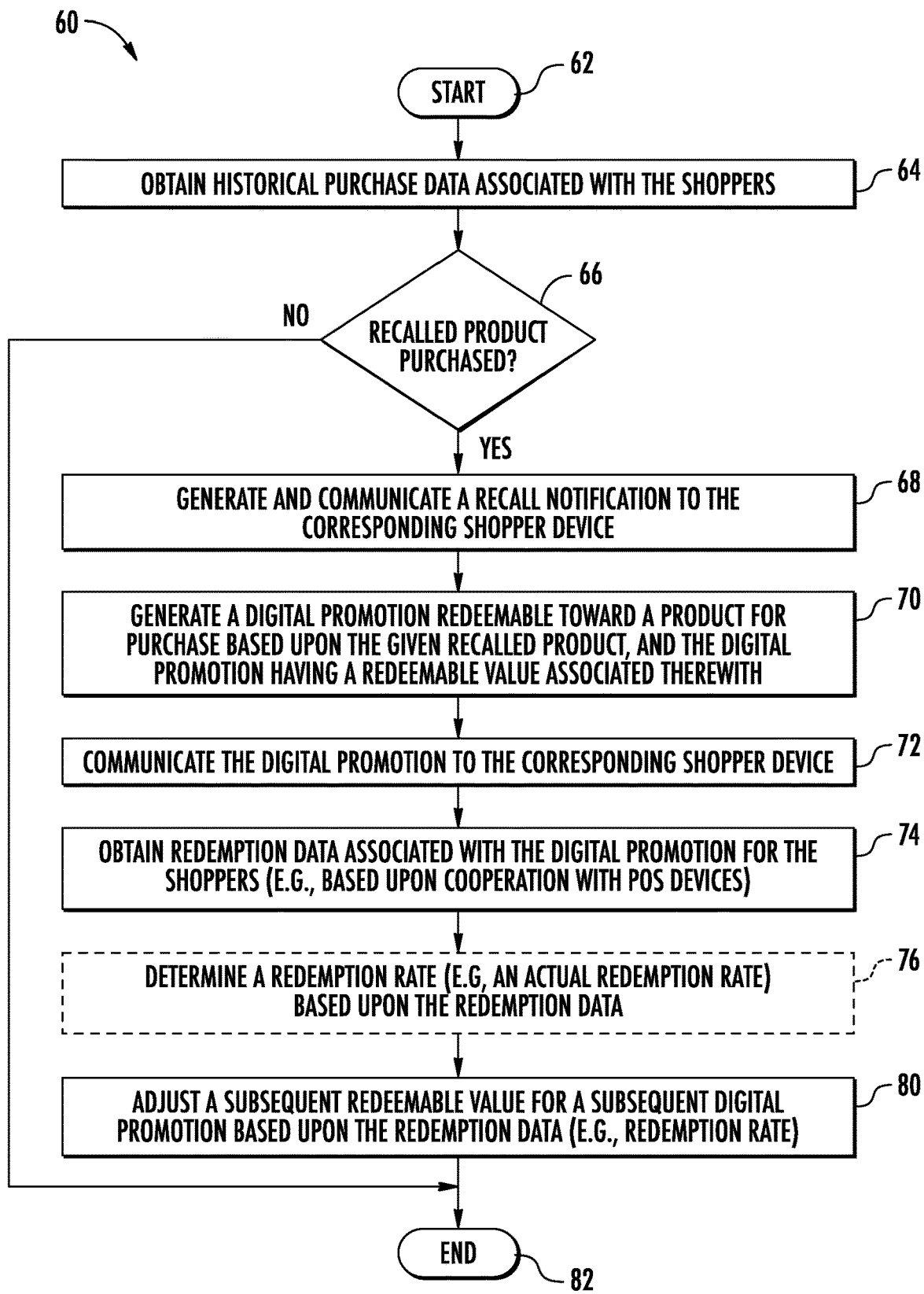
FIG. 5 is a flow diagram illustrating operation of the recall-promotion processing server of FIG. 1.

Referring now additionally to the flowchart 60 in FIG. 5, beginning at Block 62, operations of the recall-promotion processing server 40 as they relate to processing a recall and promotion will now be described. At Block 64, the recall-promotion processing server 40 obtains historical purchase data 21 associated with the shoppers. Historical purchase data 21 may include purchased product identification data (e.g., uniform product code (UPC), stock keeping unit (SKU) data), historical purchase quantity data (e.g., cumulatively and/or per shopping trip), product description data, product and shopping trip price data, time and date of purchase data, retailer identification and location data, and coupon redemption data (e.g., whether a coupon was redeemed, which product it was redeemed toward, and the redemption value). The historical purchase data 21 may include other and/or additional data. The historical purchase data 21 may be stored in the memory 42 and be obtained on a per-item purchase (e.g., as it is being checked out or scanned, or added to a virtual shopping cart), per-purchase basis, or on a batch basis at a time interval. The recall-promotion processing server 40 may interface with point-of-sale (POS) devices 35a-35n at retailers to obtain the historical purchase data 21, or, in the case of an online retailer, interface with the e-commerce server or backend to obtain the historical purchase data.

At Block 66, the recall-promotion processing server 40 determines whether a given recalled product 22 was purchased by a given shopper from among the shoppers based upon the historical purchase data 21. For example, the given recalled product 22 may have a product identifier 23 associated therewith (e.g., UPC, SKU), and the recall-promotion processing server 40 may determine a match between product identifiers from the historical purchase data 21 and the product identifier 23 of a recalled product to determine the given recalled product (e.g., obtained from a manufacturer or recalled product database). Other factors may be used in determining whether a given shopper purchased a recalled product, for example, matching of product descriptions. If, at Block 66, the given recalled product was not purchased, operations end at Block 82.

The recall-promotion processing server 40, at Block 68 generates and communicates a recall notification 24 to the corresponding shopper device 30a associated with the given shopper. The recall notification 24 may include information about the product being recalled, including, for example, data included in the historical purchase data 21. The recall notification 24 may also include a reason for the recall and directions with respect to disposition of the given recalled product 22. The notification 24 is communicated, for example, wirelessly, to the corresponding shopper device 30a so that the shopper device displays the notification on a display. The notification 24 may, alternatively or additionally, be communicated via email or short-messaging-service, for example. The given shopper's email address and telephone number may be obtained, for example, from loyalty account data and shopper identification data, which may be correlated to and stored with the historical purchase data 21.

The recall-promotion processing server 40 generates a digital promotion 25 (Block 70). The digital promotion 25 is illustratively in the form of a digital coupon. The digital coupon 25 is redeemable toward a product for purchase based upon the given recalled product 22. For example, the digital coupon 25 may be redeemable toward the same (albeit non-recalled) product as the recalled product 22, a different product from the same manufacturer or brand as the recalled product, or a different product within the same product category as the recalled product. In an exemplary implementation, if the recalled product 22 is baby formula, the digital coupon 25 may be redeemable toward diapers.

The digital coupon 25 has a redeemable value 51 associated therewith (e.g., a monetary amount off the purchase of a product designated by the digital coupon). The redeemable value 51 may be initially set to a baseline value (e.g., conceptually an initial digital coupon or offer), and may be based upon the purchase price of the recalled product 22, for example.

Figure 1:
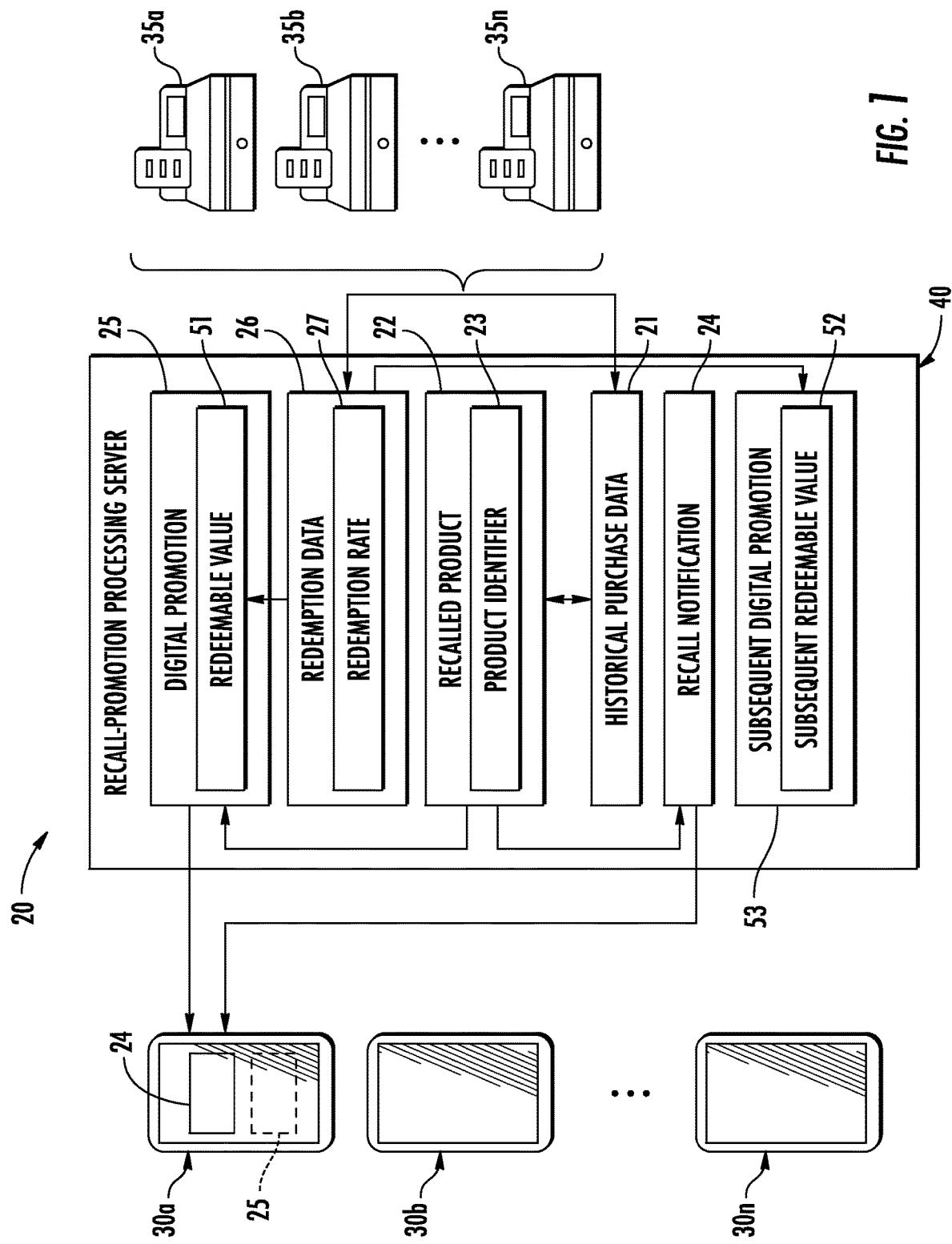
FIG. 1 is a schematic diagram of a recall and promotion processing system in accordance with an embodiment.
Figure 2:
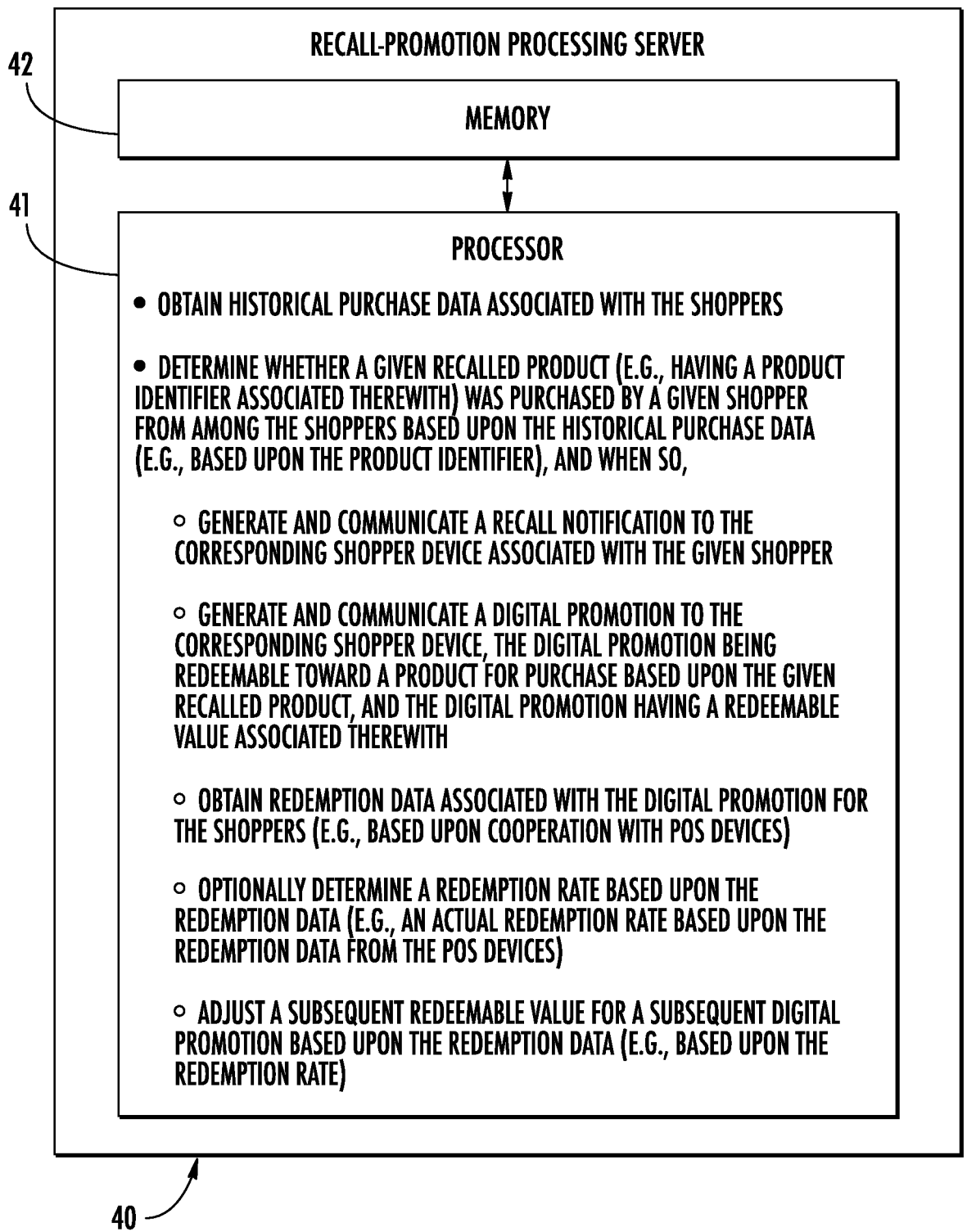
FIG. 2 is a schematic block diagram of the recall-promotion processing server of FIG. 1.
Figure 3:
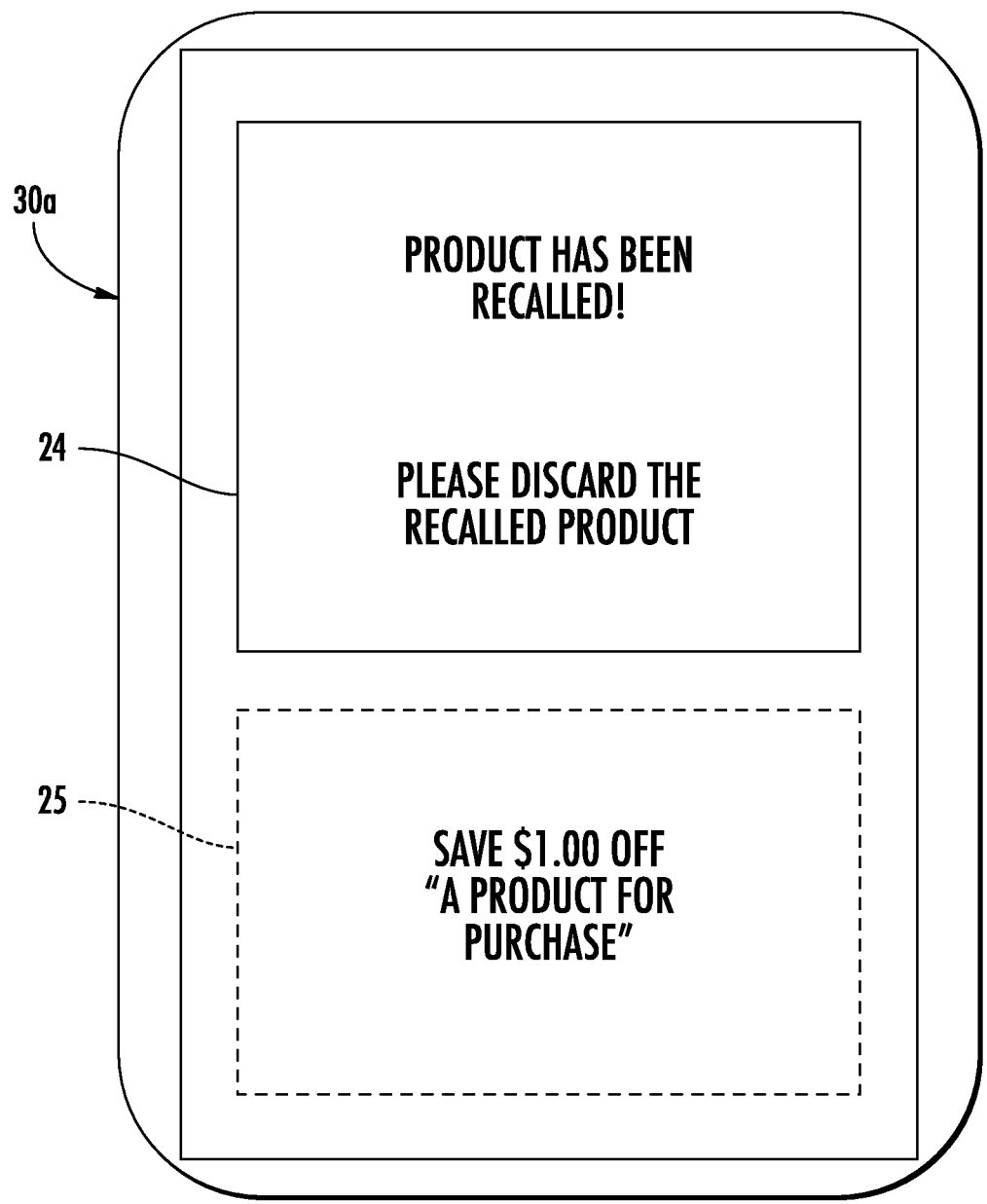
FIG. 3 is a schematic diagram of the given shopper device of FIG. 1.

At Block 72, the recall-promotion processing server 40 communicates the digital coupon 25 to the shopper device 30*a* associated with the given shopper (FIG. 3). The digital coupon 25 may be displayed on a display of the shopper device 30*a*, for example, as a notification, for example, prompting the given shopper to accept the digital coupon. The digital coupon 25 may be displayed concurrently with the recall notification 24 (FIG. 3). Upon acceptance of the digital coupon 25, the recall-promotion processing server 40 may cooperate with the given shopper device 30*a* to save the digital coupon in a digital wallet associated with the given shopper. The given shopper may also be prompted to, for example, where the digital coupon 25 is redeemable at more than one retailer, select the digital wallet or loyalty account to which to save the digital coupon.

The recall-promotion processing server 40 obtains redemption data 26 associated with the digital coupon 25 for the shoppers (Block 74). In other words, the recall-promotion processing server 40 obtains data indicative of whether any given digital coupon 25 has been redeemed. The redemption data 26 may include information indicative of whether a given digital coupon 25 was communicated, saved to a digital wallet, and/or redeemed. In an embodiment, the recall-promotion processing server 40 may cooperate with POS devices 35*a*-35*n* to obtain the redemption data 26, which may be communicated from the POS devices to the recall-promotion processing server, for example. The redemption data 26 may be obtained as transactions are being processed at the POS devices 35*a*-35*n* so as to be obtained in what may be considered by those skilled in the art as being real-time. As will be appreciated by those skilled in the art, the POS devices 35*a*-35*n* may include POS terminal devices (e.g., physical pin/keypad with payment card swiping, product scanning) at a physical retailer or store, and/or a payment backend or application programming interface (API) or an e-commerce platform.

At Block 76, the recall-promotion processing server 40 may, based upon the redemption data 26, determine a redemption rate 27. The redemption rate 27 may be expressed as a percentage of redeemed versus generated and communicated digital coupons 25. The redemption rate 27 may be an actual redemption rate, for example, as the redemption data 26 may be obtained from the POS devices 35*a*-35*n*.

As will be appreciated by those skilled in the art, the actual redemption rate 26 may be considered an indication of penetration of the recall notification 24 and disposition of the given recalled product 22. For example, a recall notification 24 may instruct the shopper to dispose of the recalled product 22 in the trash, for example, when the recalled product is a food item. The shopper's use of the digital coupon 25 may be a relatively good way to track compliance, for example. In contrast, instructions to return the recalled product 22 to the retailer may be tracked by the recall-promotion processing server 40 by way of obtained data from the POS devices 35*a*-35*n*, for example. In other words, the system 20 may provide an increasingly or more aggressive redeemable value to shoppers impacted by a recall.

Figure 4:
FIG. 4 is a schematic diagram of a subsequent digital promotion in accordance with an embodiment.

The recall-promotion processing server 40, at Block 80, based upon the redemption data 26 adjusts the redeemable value (i.e., a subsequent redeemable value 52) of a subsequent digital coupon 53 for subsequent shoppers (FIG. 4). More particularly, the recall-promotion processing server 40 may adjust the subsequent redeemable value 52 of the subsequent digital coupon 53 for shoppers who have not yet been sent a digital coupon 25 and/or a recall notification 24. This may be the case, for example, when the recalled product may still be sold at the retailer, or historical purchase data 21 is obtained over time.

The recall-promotion processing server 40 alternatively or additionally adjusts the redeemable value 51 for shoppers that have already been communicated a recall notification 24 and a digital coupon 25, but not yet redeemed the digital coupon (e.g., essentially replacing the previous digital coupon 25 with its redeemable value 51 with a subsequent digital coupon 53 with its subsequent redeemable value 52). For example, the digital coupon 25 may have been displayed on the display of the shopper devices 30*a*-30*n*, but not have been clipped to a digital wallet or redeemed (e.g., based upon the redemption data).

The recall-promotion processing server 40 may adjust the redeemable value 51 to be higher based upon a lower, e.g., actual, redemption rate, for example. Thus, if a desired action with respect to the given recalled product 22 is less than a desired threshold, for example, by way the redemption data 26 or actual redemption rate 27, a more aggressive attempt to obtain the desired action or disposition with respect to the recalled product may be taken by adjusting the redeemable value 51. Operations end at Block 82.

Figure 6:
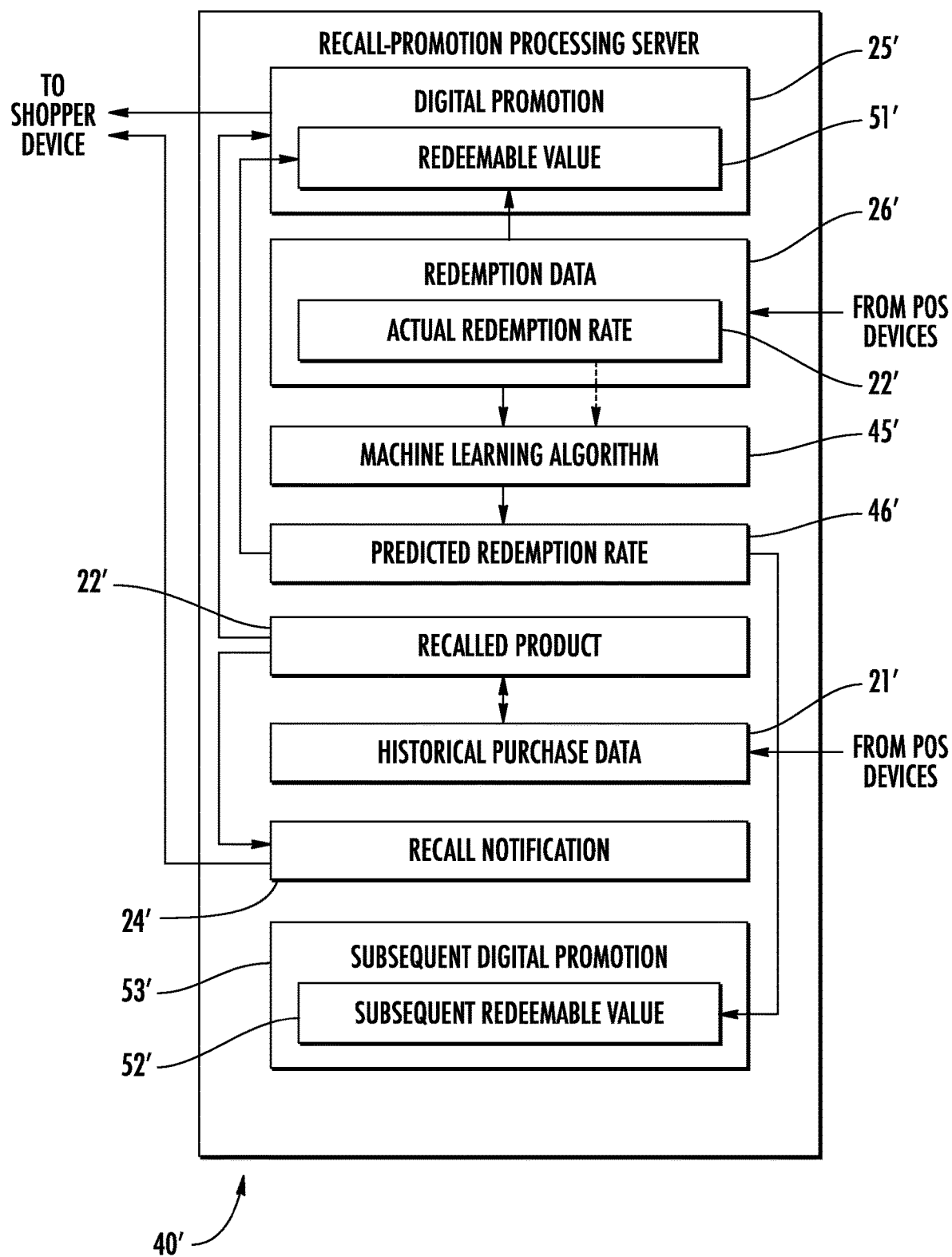
FIG. 6 is a schematic diagram of a recall and promotion processing system in accordance with another embodiment.
Figure 8:
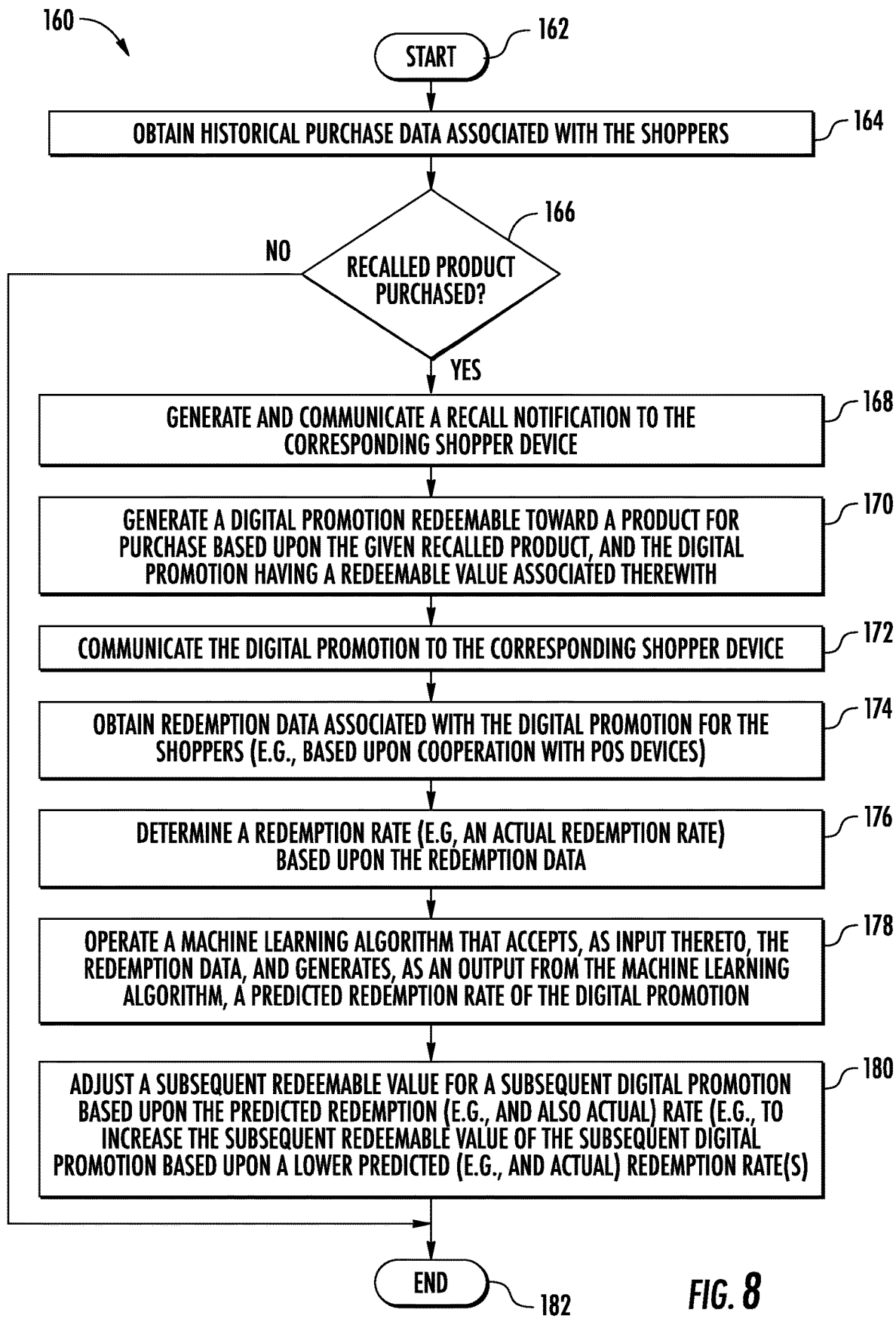
FIG. 8 is a flow diagram illustrating operation of the recall-promotion processing server of FIG. 6.

Referring now to FIGS. 6-7, and the flowchart 160 in FIG. 8, in another embodiment, the recall-promotion processing server 40' may use a predicted redemption rate 46' to further obtain a desired compliance with the recall of the recalled product 22'. The recall-promotion processing server 40' operates a machine learning algorithm 45' that accepts, as input thereto, the redemption data 26' for the shoppers (Block 178). The machine learning algorithm 45' may operate based upon a machine learning model, for example, that may include the use of artificial neural networks, decision trees, support-vector machines, regression analysis, and/or Bayesian networks, for example. The machine learning algorithm 45' generates, as an output, a predicted redemption rate 46' of the digital coupon 25' (Block 178'). The machine learning algorithm 45' may be updated, or learn, each time redemption data 26' is obtained and/or an actual redemption rate 27' is determined. In other words, the actual redemption rate 27' may be an input to the machine learning algorithm 45' to generate the predicted redemption rate 46'.

At Block 180, the recall-promotion processing server 40' may adjust the redeemable value 51' of digital coupon 25' based upon the predicted redemption rate 46' for subsequent shoppers, for example, as described above. The recall-promotion processing server 40' may, in some embodiments, adjust the redeemable value 51', based on both the actual and predicted redemption rates 27', 46', for example, when the actual redemption rate is determined (e.g., at Block 176). Similar to the embodiments described above, the recall-promotion processing server 40' may adjust the redeemable value 51' to be higher based upon a lower predicted redemption rate 46'. Thus, if a desired action with respect to the given recalled product 22' is less than a desired threshold, for example, by way of the redemption data 26' or predicted redemption rate 46' (e.g., less shoppers will be redeeming based upon an amount of communicated digital coupons 25' with a desired redeemable value within a desired time period), a more aggressive attempt to obtain the desired action or disposition with respect to the recalled product may be taken by adjusting the redeemable value 51'. Operations at Blocks 164-174 are similar to those described above with respect to Blocks 64-76. Operations end at Block 182.

A method aspect is directed to a method of processing a recall-promotion. The method includes using a recall-promotion processing server 40 to obtain historical purchase data 21 associated with a plurality of shoppers, and determine whether a given recalled product 22 was purchased by a given shopper from among the plurality of shoppers based upon the historical purchase data. The method also includes using the recall-promotion processing server 40 to, when the given recalled product 22 was purchased by the given shopper generate and communicate a recall notification 24 to a corresponding shopper device 30a-30n associated with the given shopper, and generate and communicate a digital promotion 25 to the corresponding shopper device 30a associated with the given shopper. The digital promotion 25 is redeemable toward a product for purchase based upon the given recalled product 22, and the digital promotion has a redeemable value 51 associated therewith. The method also includes using the recall-promotion processing server 40 to, when the given recalled product 22 was purchased by the given shopper, obtain redemption data 26 associated with the digital promotion 25 for the plurality of shoppers, and adjust a subsequent redeemable value 52 for a subsequent digital promotion 53 based upon the redemption data.

A computer readable medium aspect is directed to a non-transitory computer readable medium for processing a recall-promotion. The non-transitory computer readable medium includes computer executable instructions that when executed by a processor 41 of a recall-promotion processing server 40 cause the processor to perform operations. The operations include obtaining historical purchase data 21 associated with a plurality of shoppers, and determining whether a given recalled product 22 was purchased by a given shopper from among the plurality of shoppers based upon the historical purchase data. The operations also include, when the given recalled product 22 was purchased by the given shopper, generating and communicating a recall notification 24 to a corresponding shopper device 30a-30n associated with the given shopper, and generating and communicating a digital promotion 25 to the corresponding shopper device 30a associated with the given shopper. The digital promotion 25 is redeemable toward a product for purchase based upon the given recalled product 22, and the digital promotion has a redeemable value 51 associated therewith. The operations further include, when the given recalled product 22 was purchased by the given shopper, obtaining redemption data 26 associated with the digital promotion 25 for the plurality of shoppers, and adjusting a subsequent redeemable value 52 for a subsequent digital promotion 53 based upon the redemption data.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A recall and promotion processing system comprising:
   a plurality of point-of-sale (POS) devices;
   a plurality of shopper devices, each associated with a corresponding shopper; and
   a recall-promotion processing server configured to
      obtain historical purchase data associated with the plurality of shoppers, and
      determine whether a given recalled product was purchased by a given shopper from among the plurality of shoppers based upon the historical purchase data, and when so,
         generate and communicate a recall notification to the corresponding shopper device associated with the given shopper,
         generate and communicate a digital coupon to the corresponding shopper device associated with the given shopper, the digital coupon being redeemable toward a product for purchase based upon the given recalled product, and the digital coupon having a redeemable value associated therewith,
         communicate with the plurality of POS devices to obtain actual redemption data associated with the digital coupon for the plurality of shoppers as transactions at the plurality of POS devices are processed thereat and generate an actual redemption rate of the digital coupon based upon the actual redemption data,
         operate a machine learning algorithm that accepts, as an input thereto, the actual redemption rate for the plurality of shoppers, and generates, as an output from the machine learning algorithm, a predicted redemption rate associated with the digital coupon, the machine learning algorithm being updated as the transactions at the plurality of POS devices are processed, and
         adjust a subsequent redeemable value for a subsequent digital coupon based upon the actual redemption rate and the predicted redemption rate by at least increasing the subsequent redeemable value of the subsequent digital coupon based upon a lower predicted redemption rate and the actual redemption rate, and decreasing the subsequent value of the subsequent digital coupon based upon a higher predicted redemption rate and the actual redemption rate.

2. The recall and promotion processing system of claim 1 wherein the given recalled product has a product identifier associated therewith; and wherein the recall-promotion processing server is configured to determine whether the given recalled product was purchased by the given shopper based upon the product identifier.

3. The recall and promotion processing system of claim 1 wherein the recall-promotion processing server is configured to obtain the actual data in real-time.

4. A recall-promotion processing server comprising:
   a processor and an associated memory configured to
      obtain historical purchase data associated with a plurality of shoppers, and
      determine whether a given recalled product was purchased by a given shopper from among the plurality of shoppers based upon the historical purchase data, and when so,
         generate and communicate a recall notification to a corresponding shopper device associated with the given shopper,
         generate and communicate a digital coupon to the corresponding shopper device associated with the given shopper, the digital coupon being redeemable toward a product for purchase based upon the given recalled product, and the digital coupon having a redeemable value associated therewith, communicate with a plurality of point-of-sale (POS) devices to obtain actual redemption data associated with the digital promotion for the plurality of shoppers as transactions at the plurality of POS devices are processed thereat and generate an actual redemption rate of the digital coupon based upon the actual redemption data, operate a machine learning algorithm that accepts, as an input thereto, the actual redemption rate for the plurality of shoppers, and generates, as an output from the machine learning algorithm, a predicted redemption rate associated with the digital coupon, the machine learning algorithm being updated as the transactions at the plurality of POS devices are processed, and adjust a subsequent redeemable value for a subsequent digital coupon based upon the actual redemption data and the predicted redemption rate by at least increasing the subsequent redeemable value of the subsequent digital coupon based upon a lower predicted redemption rate and the actual redemption rate, and decreasing the subsequent value of the subsequent digital coupon based upon a higher predicted redemption rate and the actual redemption rate.

5. The recall-promotion processing server of claim 4 wherein the processor is configured to obtain the actual data in real-time.

6. A method of processing a recall-promotion comprising: using a recall-promotion processing server to obtain historical purchase data associated with a plurality of shoppers, and determine whether a given recalled product was purchased by a given shopper from among the plurality of shoppers based upon the historical purchase data, and when so, generate and communicate a recall notification to a corresponding shopper device associated with the given shopper, generate and communicate a digital coupon to the corresponding shopper device associated with the given shopper, the digital coupon being redeemable toward a product for purchase based upon the given recalled product, and the digital coupon having a redeemable value associated therewith, communicate with a plurality of point-of-sale (POS) devices to obtain actual redemption data associated with the digital promotion for the plurality of shoppers as transactions at the plurality of POS devices are processed thereat and generate an actual redemption rate of the digital coupon based upon the actual redemption data, operate a machine learning algorithm that accepts, as an input thereto, the actual redemption rate for the plurality of shoppers, and generates, as an output from the machine learning algorithm, a predicted redemption rate associated with the digital coupon, the machine learning algorithm being updated as the transactions at the plurality of POS devices are processed, and adjust a subsequent redeemable value for a subsequent digital coupon based upon the actual redemption data and the predicted redemption rate by at least increasing the subsequent redeemable value of the subsequent digital coupon based upon a lower predicted redemption rate and the actual redemption rate, and decreasing the subsequent value of the subsequent digital coupon based upon a higher predicted redemption rate and the actual redemption rate.

7. The method of claim 6 wherein using the recall-promotion processing server comprises using the recall-promotion processing server to obtain the actual data in real-time.

8. A non-transitory computer readable medium for processing a recall-promotion, the non-transitory computer readable medium comprising computer executable instructions that when executed by a processor of a recall-promotion processing server cause the processor to perform operations comprising:

obtaining historical purchase data associated with a plurality of shoppers; and determining whether a given recalled product was purchased by a given shopper from among the plurality of shoppers based upon the historical purchase data, and when so, generating and communicating a recall notification to a corresponding shopper device associated with the given shopper, generating and communicating a digital coupon to the corresponding shopper device associated with the given shopper, the digital coupon being redeemable toward a product for purchase based upon the given recalled product, and the digital coupon having a redeemable value associated therewith, communicating with a plurality of point-of-sale (POS) devices to obtain actual redemption data associated with the digital coupon for the plurality of shoppers as transactions at the plurality of POS devices are processed thereat and generate an actual redemption rate of the digital coupon based upon the actual redemption data, operating a machine learning algorithm that accepts, as an input thereto, the actual redemption rate for the plurality of shoppers, and generates, as an output from the machine learning algorithm, a predicted redemption rate associated with the digital coupon, the machine learning algorithm being updated as the transactions at the plurality of POS devices are processed, and adjusting a subsequent redeemable value for a subsequent digital coupon based upon the actual redemption data and the predicted redemption rate by at least increasing the subsequent redeemable value of the subsequent digital coupon based upon a lower predicted redemption rate and the actual redemption rate, and decreasing the subsequent value of the subsequent digital coupon based upon a higher predicted redemption rate and the actual redemption rate.

9. The non-transitory computer readable medium of claim 8 wherein the operations comprise obtaining the actual data in real-time.

* * * * *